United States Patent [19]

Meszlenyi

[11] Patent Number: 5,430,632
[45] Date of Patent: Jul. 4, 1995

[54] SELF-OSCILLATING DC TO DC CONVERTER

[75] Inventor: Ivan Meszlenyi, North York, Canada

[73] Assignee: Powerpaq Industries Inc., Downsview, Canada

[21] Appl. No.: 255,991

[22] Filed: Jun. 8, 1994

[30] Foreign Application Priority Data

May 26, 1994 [CA] Canada .................................. 2124370

[51] Int. Cl.⁶ .......................................... H02M 3/335
[52] U.S. Cl. ...................................... 363/17; 363/98; 363/132
[58] Field of Search ........................ 363/16, 17, 18, 19, 363/22, 23, 40, 58, 98, 132; 323/901

[56] References Cited

U.S. PATENT DOCUMENTS

| | | | |
|---|---|---|---|
| 4,605,999 | 8/1986 | Bowman et al. | 363/19 |
| 4,646,217 | 2/1987 | Baroni et al. | 363/17 |
| 4,736,283 | 4/1988 | Yasumura | 363/19 |
| 4,814,962 | 3/1989 | Magalhaes et al. | 363/16 |
| 4,884,186 | 11/1989 | Small | 363/132 |
| 5,073,849 | 12/1991 | Morris | 363/21 |
| 5,268,830 | 12/1993 | Loftus, Jr. | 363/17 |
| 5,291,383 | 3/1994 | Oughton | 363/17 |
| 5,303,137 | 4/1994 | Peterson | 363/16 |

OTHER PUBLICATIONS

Study of a Generic Topology for a Double Nonlinear Resonant Pole Converter, J. R. de Villers et al 1992 IEEE pp. 633–640.
A Half Bridge, Self-Oscillating, Multi—Resonant Converter Circuit, William A. Peterson et al, 1993 IEEE, pp. 77–84.
High–Frequency Resonant Transistor Dc—DC Converters Robert L. Steigerwald IEEE, vol. IE-31, No. 2 May 1984 pp. 181–191.
A Parallel Resonant Converter for Use on Commercial Aircraft, Greg Stock, HFPC Apr. 1994 Proceedings pp. 357, 358 and 362.

Primary Examiner—Steven L. Stephan
Assistant Examiner—Adolf Berhane
Attorney, Agent, or Firm—Sim & McBurney

[57] ABSTRACT

A self oscillating power converter utilizing a pair of MOSFET transistor switches in a half bridge configuration wherein the junction of the two transistors is coupled to a reactive network which in turn is connected to an output rectifier. The gate-to-drain inter-electrode capacitance of the switching transistors serves as the sole means of sustaining oscillations. Oscillations are started at the gate-to-source electrodes of the transistors by a startup circuit. The frequency of oscillation is determined by the gate-to-source capacitance of the transistors and the inductance of the drive transformer which couples the source-to-gate electrodes of the transistors to each other. The drive transformer is provided with a means of varying its inductance thereby changing the switching frequency so as to regulate the voltage.

14 Claims, 5 Drawing Sheets

SELF-OSCILLATING DC TO DC CONVERTER

TECHNICAL FIELD

This invention relates in general to DC to DC converters, and more particularly to DC to DC converters which employ a half-bridge configuration and which operate in a self-oscillating mode.

BACKGROUND OF THE INVENTION

Direct current to direct current (DC to DC) converters which employ a half-bridge configuration and which operate in a self-oscillating mode, are commonly realized by converter topologies which are referred to in the art as resonant pole converters. These converters have zero voltage switching and are classified into three categories: linear resonant pole, non-linear resonant pole, and double non-linear resonant pole.

Resonant pole converters are characterized by simple circuit designs which integrate some of the circuit parasitics into the required functionality. However, operation of such converters at higher frequencies becomes extremely difficult to achieve without sacrificing efficiency and without producing high levels of electromagnetic interference. The frequency of operation for prior art converters is limited to approximately 200 kHz. In order to combat the aforesaid limitations, the double non-linear resonant pole converter has been developed which has lowered switching losses, reduced parasitic oscillations, etc., as disclosed in the "Study of a Generic Topology for a Double Non-Linear Resonant Pole Converter" by J. R. DeVilliers. J. D. Van Wyk, J. A. Ferreira, IEEE Power Electronics Specialist Conference, 1992, pages 633–638. In addition to using a non-linear saturating inductor, a non-linear capacitor is utilized as a regenerative snubber in the aforesaid topology.

Aside from the technical difficulties referred to above, which arise from increased frequency of operation, prior art resonant pole converters suffer from an important shortcoming in that there are no cost effective methods of regulation of these converters. The obvious solution of a pre-regulator is unacceptable since that would complicate the circuit design, thereby eliminating the most advantageous characteristic of such prior art converters—namely, simplicity of circuit design.

For example, in a recent article entitled "Half Bridge, Self-Oscillating, Multi-Resonant Converter Circuit" by W. A. Peterson and R. Saint-Pierre, 1993, IEEE 0-7803-0982-0/93, pages 77–84, a zero voltage switching circuit is disclosed which is of simple design, but does not offer voltage regulation. The claimed usefulness of this circuit is its ability to provide short circuit protection by limiting the voltage across the resonant capacitor with diode clamps. Under these conditions, a series resonant circuit is formed which utilizes the leakage inductance of the output isolation transformer. The frequency in this circuit is limited to about 100 kHz and the efficiency is approximately 75%.

Accordingly, the inventor has recognized the desirability of a conversion topology which operates at a very high frequency (ie. into the MHz range), which integrates the major device and component parasitics thereby simplifying the circuit design, and which provides a simple means of regulation of the output voltage regardless of line and load variations. The existing topologies do not offer solutions to these problems.

SUMMARY OF THE INVENTION

The present invention provides a new topology for DC to DC conversion in which a very high degree of integration of all major parasitics, both inductive and capacitive, is achieved. By having individual components perform multiple tasks, only a minimum number of components are required to achieve very high switching frequencies and thereby minimize cost, simplify construction and maximize performance.

According to the preferred embodiment, a direct current to direct current (DC to DC) self-oscillating converter is provided which uses a pair of switching transistors connected in a half bridge configuration to respective drive signal windings of an isolated gate drive transformer in such a way that all intrinsic capacitances of the transistors are fully incorporated into the functionality of the converter. The transistors are connected, in turn, to the primary winding of an output isolation transformer. A start-up circuit is provided to initiate the oscillation of the half bridge.

The gate-to-source intrinsic capacitance of the transistors serves to provide the necessary tank capacitance, while the drain-to-source intrinsic capacitance of the transistors, in combination with the inductance of the load, functions as a regenerative snubber, and the intrinsic gate-to-drain capacitance of the transistors serves to provide the necessary feedback for the converter.

The variable inductance ($L_M$) of the isolated gate drive transformer serves as the frequency controlling inductance of a frequency determining circuit for the converter. Regulation of the converter is achieved by passing a small direct current through the control windings of the isolated gate drive transformer which causes a change in its inductance and in turn, the frequency of oscillation. A zener diode can be used as a simple means to implement the control function. Accordingly, the circuit of the present invention can operate without any external capacitor, greatly reducing parasitic oscillatory tendencies, and at the same time providing a convenient means for regulation. When using an isolated gate drive transformer, the magnetic feedback eliminates the need for use of an optocoupler.

The change in frequency of the converter is utilized to vary the output power via resonant means where an equivalent resonant tank inductor is provided by the leakage inductance ($L_L$) of the output isolation transformer and an equivalent resonant capacitor is provided by the capacitance presented by the output rectification circuitry. The ability to utilize a high leakage transformer for the output isolation transformer facilitates and simplifies adherence to legislated safety standards. This increased integration of parasitic elements of the converter provides a significant increase in the power density over prior art resonant converters, while keeping parasitic oscillations to a minimum, and thus lowering EMI.

Regulated multiple outputs can be obtained by tight coupling of the output windings to the secondary winding that carries the highest power. The number of cross-regulated outputs is limited only by the construction of the transformer. The output isolation transformer provides effective decoupling of the common mode noise, and is characterized by reduced primary to secondary capacitance.

The highly simplified regulation method together with the very high operating frequency of this new topology, yields very fast response. A lower component count is achieved in the circuitry of the present invention than has been achieved in any other prior art topology, resulting in low cost construction, an exceptionally high MTBF and power density, as well as outstanding efficiency.

According to an additional aspect, the DC to DC self-oscillating converter of the present invention can be used in a full bridge configuration by the addition of two windings to the isolated gate drive transformer, thereby extending the power handling limitations of the circuit to the kW range.

Another principal use of the topology of the present invention is AC to DC conversion, wherein a simple diode bridge may be added to convert the AC current to the required DC for input to the DC to DC converter of the preferred embodiment. This arrangement results in power factors approaching unity, thereby facilitating use of the converter as a pre-regulator with power factor correction.

Yet another principal use of the topology of the present invention is generation of high power, high frequency sinusoidal waves. The RF energy generated in this manner can be used to drive an antenna for radio-transmission or for use with an ultrasonic transducer for industrial or medical purposes.

BRIEF DESCRIPTION OF THE DRAWINGS

A detailed description of the preferred embodiment is provided herein with reference to the drawings, in which.

DESCRIPTION OF THE PREFERRED EMBODIMENT

Figure 1:
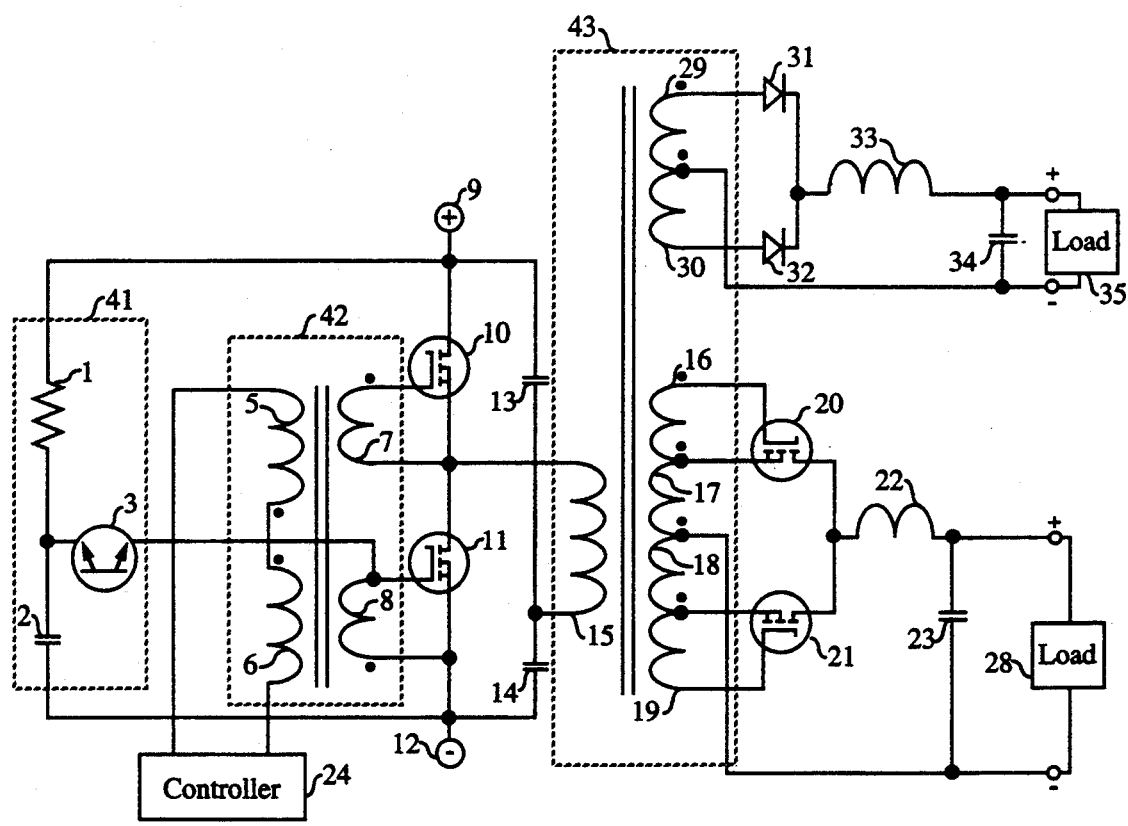
FIG. 1 is a detailed circuit diagram of a MOSFET half-bridge, self oscillating, cross regulated resonant converter in accordance with the preferred embodiment.

An embodiment of the present invention is described below with reference to the attached drawings. In order to simplify the descriptions of the various embodiments, identical reference numerals have been assigned to identical components throughout the Figures.

FIG. 1 is a schematic diagram of a self-oscillating, cross-regulated resonant converter in accordance with the preferred embodiment comprising two MOSFET transistors 10 and 11 connected to an isolated gate drive transformer 42 consisting of control windings 5 and 6 and drive signal windings 7 and 8. The gate of MOSFET transistor 10 is connected to the dotted end of drive signal winding 7 and the drain is connected to the positive DC input lead 9. The gate of MOSFET transistor 11 is connected to the undotted end of drive signal winding 8 and the source is connected to the negative DC input lead 12 and also to the dotted end of drive signal winding 8. The undotted end of gate drive inductor 7 is connected to the midpoint of the source-to-drain connection between MOSFET transistors 10 and 11. The dotted end of control winding 5 is connected to the dotted end of control winding 6. The undotted end of control winding 5 and the undotted end of control winding 6 of the isolated gate drive transformer 42 are connected to a controller 24. A decoupling capacitor 13 is fed by the positive DC input lead 9 and in turn is connected to decoupling capacitor 14 which is fed by the negative DC input lead 12.

One end of the primary winding 15 of the output isolation transformer 43 is connected to the junction of capacitors 13 and 14 while the other end is connected to the midpoint of the source-to-drain connection between MOSFET transistors 10 and 11. MOSFET transistors for rectification 20 and 21 are connected to secondary windings 17 and 18, and also to the rectification control windings 16 and 19 of the output isolation transformer. The gate of MOSFET transistor 20 is connected to the dotted end rectification of control winding 16 and the source is connected to the undotted end of rectification control winding 16 which, in turn, is connected to the dotted end of secondary winding 17. The undotted end of winding 17 is connected to the dotted end of secondary winding 18 which, in turn, is connected to the undotted end of rectification control winding 19 and also to the source of MOSFET transistor 21. The gate of MOSFET transistor 21 is connected to the dotted end rectification of control winding 19.

The start-up circuit of the converter comprises a start-up resistor 1 connected to a start-up capacitor 2 and also to a voltage sensitive trigger diode 3 which is connected to the gate of MOSFET transistor 11.

One end of an output filter inductor 22 is connected to the midpoint of the drain-to-drain connection between MOSFETs 20 and 21, and the other end is connected to an output filter capacitor 23 and the positive end of load 28. The other end of filter capacitor 23 is connected to the junction point of secondary windings 17 and 18 and also to the negative end of load 28.

An auxiliary output of the converter comprises second output windings 29 and 30 where the dotted end of output winding 29 is connected to a first output rectifier 31. The undotted end of output winding 29 is connected to the dotted end of output winding 30. The undotted end of winding 30 is connected to a second output rectifier 32. A second output filter inductor 33 is connected to the midpoint of the connection between rectifiers 31 and 32, and also to a second output filter capacitor 34 which is connected in parallel to a load 35. The other end of output filter capacitor 34 is connected to the junction point of output windings 29 and 30.

Figure 2:
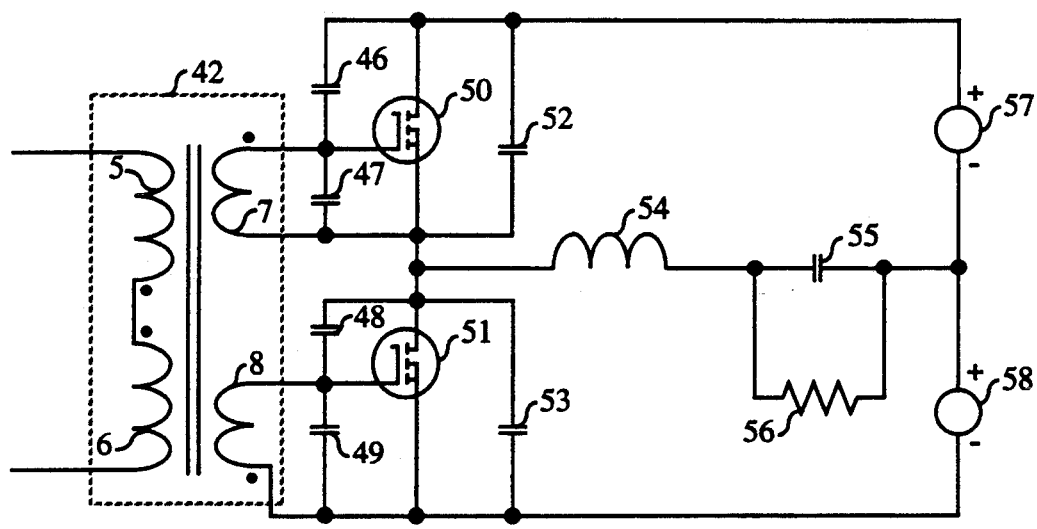
FIG. 2 is an equivalent circuit of the preferred embodiment illustrated in FIG. 1.

FIG. 2 is a schematic diagram of an equivalent circuit of the preferred embodiment where two ideal MOSFETs 50 and 51 are connected to drive signal windings 7 and 8, respectively, which, for the purpose of the equivalent circuit of FIG. 2, form an equivalent gate tank inductance. The gate of MOSFET 50 is connected to the dotted end of drive signal winding 7 and the source is connected to the undotted end of drive signal winding 7. An equivalent gate-to-source capacitance 47 is connected in parallel to drive signal winding 7 and in series with an equivalent gate-to-drain capacitance 46 which is, in turn, connected to the drain of MOSFET 50. An equivalent drain-to-source capacitance 52 is connected in parallel to MOSFET 50. Similarly, the gate of MOSFET 51 is connected to the undotted end of drive signal winding 8 and the source is connected to the dotted end of drive signal winding 8. An equivalent gate-to-source capacitance 49 is connected in parallel to drive signal winding 8 and in series with an equivalent gate-to-drain capacitance 48 which is in turn connected to the drain of MOSFET 51. An equivalent drain-to-source capacitance 53 is connected in parallel to MOSFET 51. One end of an equivalent resonant tank inductor 54 is connected to the midpoint of the source-to-drain connection between MOSFETs 50 and 51 while the other end is connected to an equivalent resonant capacitor 55 which is connected in parallel to a load resistance 56. The equivalent resonant capacitor 55 is derived from the intrinsic gate-to-source capacitance of the rectification MOSFETs 20 and 21. The parallel combination of resistor 56 and capacitor 55 is connected to the midpoint of the negative to positive connection of voltage sources 57 and 58. The positive terminal of voltage source 57 is connected to the drain of MOSFET 50 and the negative terminal of voltage source 58 is connected to the source of MOSFET 51.

Figure 3A:
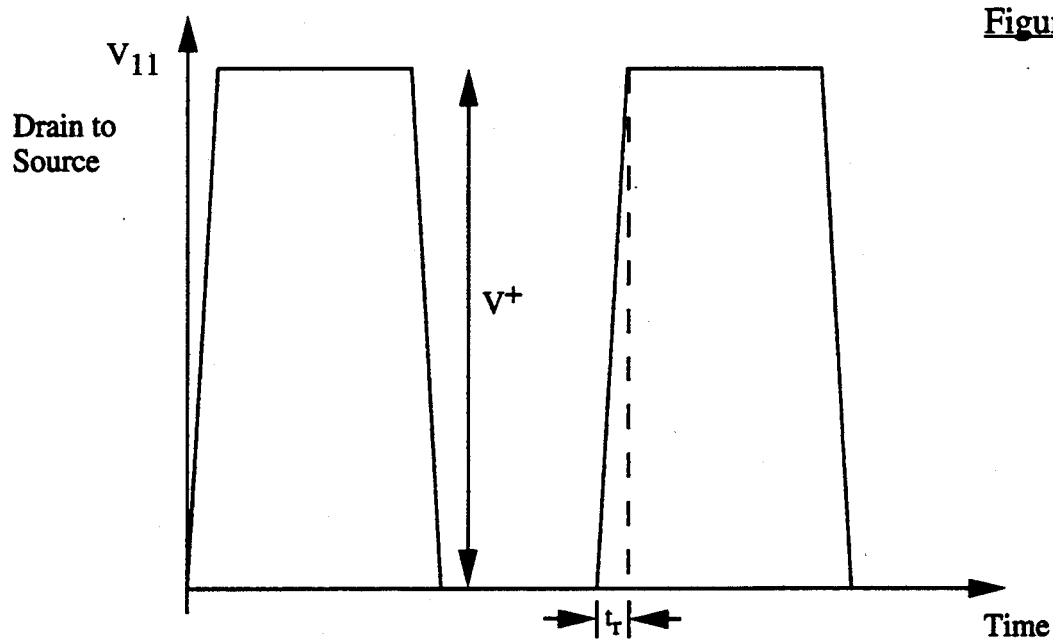
FIGS. 3a, 3b and 3c show the waveforms of the drain-to-source voltage, gate-to-source voltage and current flowing through the drain-to-gate intrinsic capacitances, respectively, of a MOSFET switch of the circuit shown in FIGS. 1 and 2.
Figure 3B:
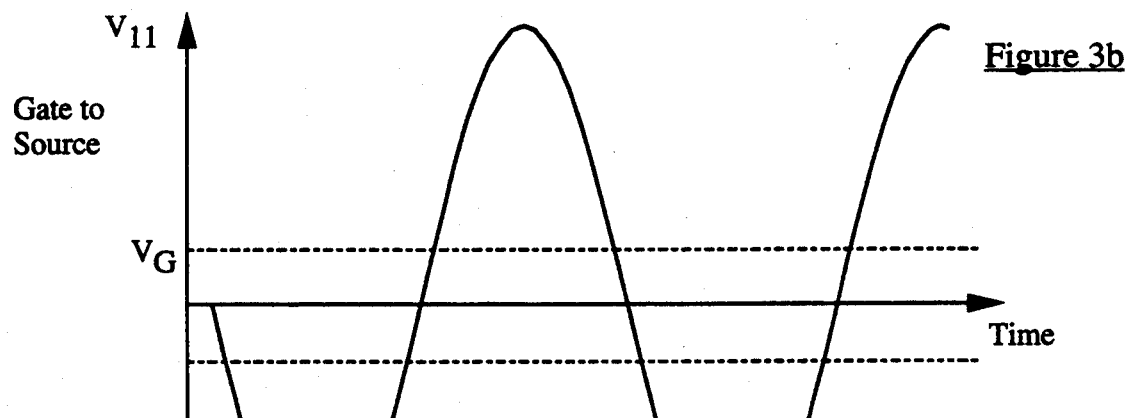
Figure 3C:
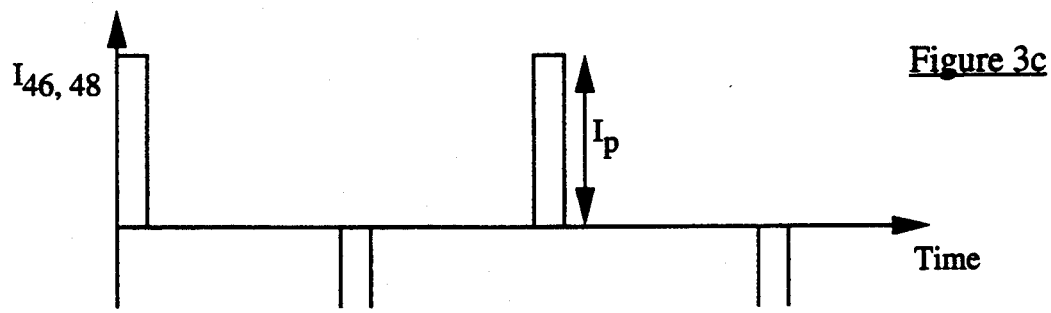

The operation of the circuitry of the preferred embodiment is discussed in detail with respect to FIGS. 1 and 2. Initially, MOSFET transistors 10 and 11 are both in an "off" state. When DC power is applied to the positive and negative DC inputs 9 and 12, respectively, start-up capacitor 2 begins to charge through resistor 1 until the threshold voltage of voltage sensitive trigger diode 3 is reached. At that moment, the stored energy in capacitor 2 is dumped into the gate resonant tank consisting of the drive signal windings 7 and 8, and gate-to-source capacitances 47 and 49 of the MOSFET transistors as shown in FIG. 2. This results in a rising gate drive signal supported by the capacitive feedback until, in any given cycle, an equilibrium is established between the feedback energy and the energy lost in the resonant tank. A sinusoidal gate drive signal appears across the gate to source electrodes of MOSFET 11 while drive transformer 42 inverts the same signal across the gate to source electrodes of MOSFET 10. When the gate voltage of MOSFET transistor 11 falls below the "on" level ($V_G$ in FIG. 3b), then the current stored in the equivalent resonant tank inductor 54 begins to charge the drain-to-source equivalent capacitances 53 and 52 of transistors 11 and 10, resulting in the trapezoidal voltage waveform shown in FIG. 3a. The rising and falling edges of the waveform in FIG. 3a represents the aforementioned charging process. A current pulse (as shown in FIG. 3c) having an amplitude $I_p$ which is proportional to the rate of the voltage change at the transitions, is then injected into said resonant tank comprising drive signal winding 8 and equivalent gate-to-source capacitance 49, thereby replenishing the energy lost in the half cycle. The amplitude of the gate-to-drain current can be expressed as:

$$I_{peak} = C \frac{dV}{dt} = \frac{C_{48} V^+}{t_r} \qquad (1)$$

where, $V^+$ is the supply voltage, $t_r$ is the rise time of the voltage waveform (shown in FIG. 3a).

When the cycle reverses, the same process will be repeated for MOSFET transistor 10, which turns on after MOSFET transistor 11 turns off. To sustain oscillation, the energy packages delivered by the current pulses resulting from the rising and falling edges of the voltage waveform shown in FIG. 3a, must satisfy the following conditions:

$$E_{abs} = \tfrac{1}{2} C_m (\Delta V)^2 \qquad (2)$$

where $C_m = C_{49} + C_{47}$, and where $\Delta V$ is the incremental voltage change across the gate resonant tank.

This equation expresses the fact that the absorbed energy ($E_{abs}$) per cycle in the resonant tank has to be equal to the energy packages delivered to the resonant tank in each cycle in order to achieve constant amplitude.

The incremental voltage change can be expressed as:

$$\Delta V = \frac{Q}{C} = \frac{I_{peak} t_r}{C_{in}} \qquad (3)$$

Substituting Equations (1) and (3) into Equation (2) results in:

$$E_{abs} = \frac{1}{2} \frac{C_{48}^2}{C_{in}} (V^+)^2 \qquad (4)$$

The control of the converter's frequency is achieved by varying the inductance of the drive transformer 42. One straightforward manner of constructing a drive transformer with variable inductance is to use two cores, each having a control winding installed on it, wherein the control windings are connected in series (ie. windings 5 and 6 in FIGS. 1 and 2). The drive signal windings 7 and 8 which perform the inverting of the gate drive signal are installed so as to share the two magnetic cores since it is desirable to minimize the leakage inductance in order to avoid parasitic oscillations. The current flowing through the control windings 5 and 6 reduces the inductance of the drive transformer which in turn increases the resonant frequency ($F_r$) of the gate tank circuit:

$$F_r = \frac{1}{2\pi \sqrt{L_M C_T}} \qquad (5)$$

where $$C_r = C_{49} + C_{47} \qquad (6)$$

Accordingly, a large shift in frequency can be achieved without degradation of the gate drive signal.

Figure 4:
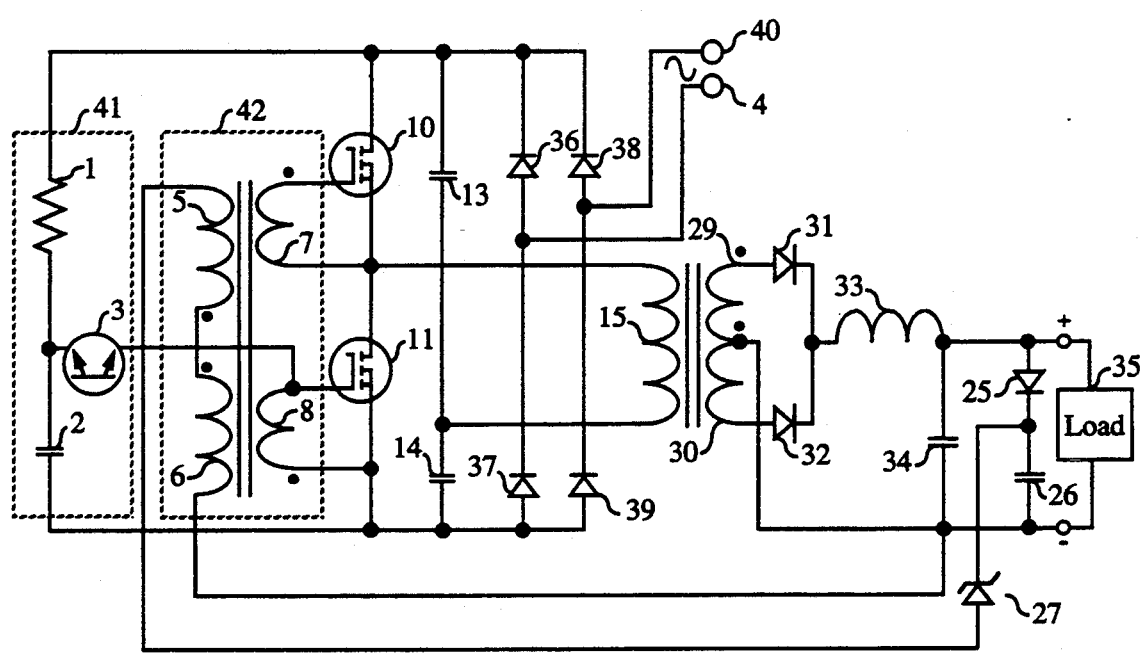
FIG. 4 is a detailed circuit diagram of an alternative embodiment of the invention wherein the converter is utilized for AC to DC conversion.

FIG. 4 shows a schematic diagram of an alternative to the preferred embodiment which is in the form of an AC to DC regulated converter with high power factor. Rectifiers 36, 37, 38, and 39 are utilized to convert an AC current at terminals 40 and 4, to a direct current which powers the circuit at the equivalent points to the positive and negative DC inputs 9 and 12, respectively, shown in FIG. 1. Peak rectifier 25 and peak holding capacitor 26 form a peak detector circuit. The peak ripple voltage is sensed by zener diode 27, thereby providing a simple means to achieve control of the frequency by the control current flowing through zener diode 27 and control windings 5 and 6.

Figure 5:
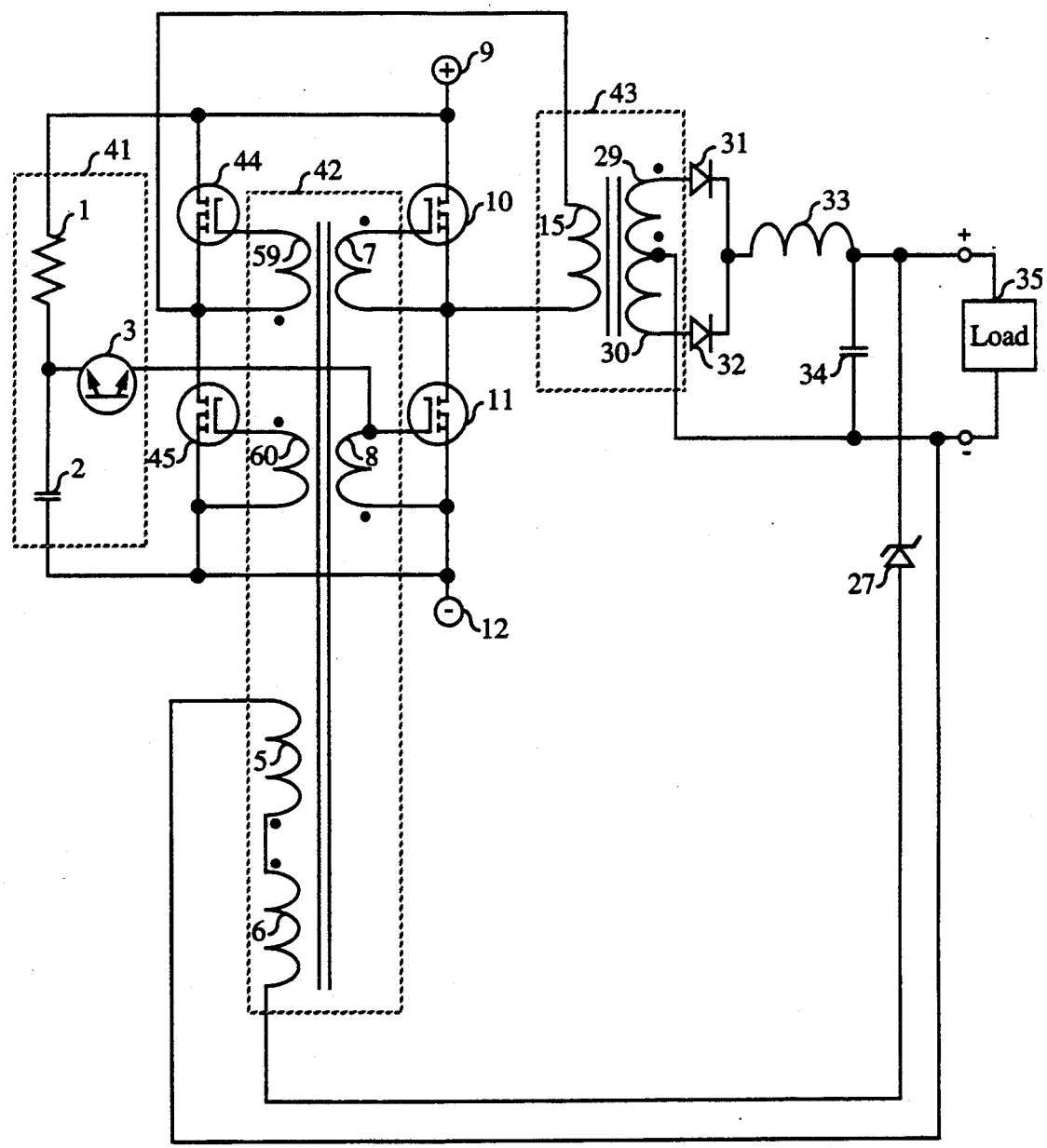
FIG. 5 is a detailed schematic diagram of a full-bridge, self oscillating, resonant converter in accordance with a further alternative embodiment of the invention.

FIG. 5 is a schematic diagram of a further alternative embodiment for achieving higher power levels than are attainable by the embodiments discussed above. According to the embodiment of FIG. 5, a full-bridge configuration is provided by the addition of MOSFET transistors 44 and 45 and additional drive signal windings 59 and 60. The gate of MOSFET transistor 44 is connected to the undotted end of drive signal winding 59, and the drain is connected to the junction of start-up resistor 1 and the positive DC input lead 9. The gate of MOSFET transistor 45 is connected to the dotted end of drive signal winding 60, and the source is connected to the undotted end of drive signal winding 60. The midpoint of the drain-to-source connection between MOSFET transistors 44 and 45 is connected to the primary winding 15 of the output isolation transformer 43.

In summary, according to the present invention, a self oscillating power converter is provided comprising a minimum number of components which perform multiple functions. For example, in addition to the primary function of the output rectifier, it also provides resonant capacitance. The isolation transformer not only provides isolation while converting the output voltage to a desired value, it also provides integration of the resonant inductor and gives multiple output capabilities.

Thermal protection can be achieved by using a magnetic core with a low curie temperature for construction of the isolated gate drive transformer.

It should be clear to those skilled in the art that further embodiments of the present invention may be made by those skilled in the art. For example, in order to further reduce any turn off losses that may be present during the transitions of the switching of the MOSFET transistors, external capacitors may be added parallel to the intrinsic capacitors 53 and 52. For higher output power levels it may be more practical to use an external capacitor in parallel with the secondary winding of the output isolation transformer 43 between the dotted end of the secondary 17 and the undotted end of secondary 18. This will lower the frequency of operation to a more practical value. Also, a non-isolated gate drive transformer may be used in combination with a transistor and optocoupler or other means for controlling DC current passing through the control windings. All such alternative embodiments are believed to be within the sphere and scope as defined by the claims appended hereto.

I claim:

1. A self-oscillating switch for receiving a DC input voltage from a source of said DC input voltage and in response generating a train of trapezoidal output pulses for application to a reactive network characterized by an inductive load impedance, comprising:
   a) a drive transformer having a first pair of windings and a second pair of windings, said second pair of windings being characterized by a variable inductance; and
   b) first and second switching transistor means each having a control electrode, a power input electrode and a power output electrode, the power output electrode of said first switching transistor means being connected to the power input electrode of said second switching transistor means, the power input electrode of said first switching transistor means and the power output electrode of said second switching transistor means being connected to said source of input DC voltage and the control electrodes of said first and second switching transistor means being connected to said drive transformer, such that a first one of said second pair of windings shunts the power input and control electrodes of said first switching transistor means and a second one of said second pair of windings shunts the power input and control electrodes of said second switching transistor means, each of said first and second switching transistor means having a first inter-electrode capacitance between said control and power input electrodes which in combination with said variable inductance of said second pair of windings forms a resonant tank for producing sinusoidal oscillations across said control and power input electrodes in response to said DC input voltage being applied to the power input electrode of said first switching transistor means and the power output electrode of said second switching transistor means, said oscillations having a frequency determined by said variable inductance and said first inter-electrode capacitance, thereby resulting in a train of trapezoidal output pulses being generated at a junction between the power output electrode of said first switching transistor means and the power input electrode of said second switching transistor means, each of said first and second switching transistor means also having a second inter-electrode capacitance between said control and power output electrodes for sustaining said oscillations by providing a feedback path for injecting current pulses into said resonant tank, said current pulses being derived from rising and falling edges of said trapezoidal output pulses generated at said junction, and said first and second switching transistor means further having a third inter-electrode capacitance between said power input and power output electrodes which in combination with said inductive load impedance functions as a regenerative snubber.

2. The self-oscillating switch of claim 1, wherein said first pair of windings of said drive transformer functions as a control winding means which is magnetically coupled to said second pair of windings, for varying said inductance of said second pair of windings and thereby in combination with said first inter-electrode capacitance determining said frequency of said oscillations, and wherein said second pair of windings also functions to invert said sinusoidal oscillations produced across said control and power input electrodes.

3. The self-oscillating switch of claim 2, further comprising means for controlling said variable inductance and thereby said frequency of said oscillations.

4. The self-oscillating switch of claim 3, wherein said means for controlling said variable inductance comprises means for passing a predetermined controlled amount of direct current through said control winding means.

5. The self-oscillating switch of claim 1 further comprising start-up circuit means for generating and applying a starting pulse to the control electrode of either one of said first and second switching transistor means.

6. The self-oscillating switch of claim 1, wherein said reactive network is characterized by a sufficient inductive component at said frequency of said oscillations to sustain said oscillations by charging and discharging said third inter-electrode capacitance of said input and output power electrodes of said first and second switching transistor means.

7. A self-oscillating power converter for receiving an input DC voltage at a first level and generating a DC output voltage at a second predetermined level, comprising:

a) an input for receiving said input DC voltage;
b) a drive transformer having a first pair of windings and a second pair of windings, said second pair of windings being characterized by a variable inductance;
c) first and second MOSFET transistor means each having a gate electrode, a source electrode and a drain electrode, the drain electrode of said first MOSFET transistor means being connected at a junction to the source electrode of said second MOSFET transistor means, the source electrode of said first MOSFET transistor means and the drain electrode of said second MOSFET transistor means being connected to said source of input DC voltage and the gate electrodes of said first and second MOSFET transistor means being connected to said drive transformer such that a first one of said second pair of windings shunts the source and gate electrodes of said first MOSFET transistor means and a second one of said second pair of windings shunts the source and gate electrodes of said second MOSFET transistor means, each of said first and second MOSFET transistor means having a gate-to-source capacitance which in combination with said variable inductance of said second pair of windings forms a resonant tank for producing sinusoidal oscillations across said gate and source electrodes, said oscillations having a frequency determined by said variable inductance and said gate-to-source capacitance, each of said first and second MOSFET transistor means also having a gate-to-drain capacitance for sustaining said oscillations by providing a feedback path for injecting current pulses into said resonant tank, said current pulses being derived from rising and falling edges of trapezoidal output pulses developed at said junction between the drain electrode of said first MOSFET transistor means and the source electrode of said second MOSFET transistor means;
d) reactive network means connected to output rectification means for generating said DC output voltage, said reactive network means being connected to said junction between the drain electrode of said first MOSFET transistor means and the source electrode of said second MOSFET transistor means, wherein said reactive network means is characterized by an impedance which has an inductive component at said frequency of said oscillations which, in conjunction with said source-to-drain capacitances of said first and second MOSFET transistor means, is sufficient to act as a regenerative snubber.

8. The self-oscillating power converter of claim 7, wherein said first pair of windings of said drive transformer functions as a control winding means which is magnetically coupled to said second pair of windings, for varying said inductance of said second pair of windings and thereby in combination with said gate-to-source capacitance determining said frequency of said oscillations, and wherein said second pair of windings also functions to invert said sinusoidal oscillations produced across said gate and source electrodes.

9. The self-oscillating power converter of claim 7 or 8, further comprising means for controlling said variable inductance and thereby said frequency of said oscillations.

10. The self-oscillating power converter of claim 8, wherein said means for controlling said variable inductance comprises means for passing a direct current through said control winding means.

11. The self-oscillating power converter of claim 7 further comprising start-up circuit means for generating and applying a starting pulse to the gate electrode of either one of said first and second MOSFET transistor means.

12. The self-oscillating power converter of claim 7 further including voltage regulation means comprising means for sensing said DC output voltage, means for generating a reference voltage, means for comparing said sensed DC output voltage and said reference voltage and in response generating an error current, and means for controlling said variable inductance in accordance with said error current.

13. The self-oscillating power converter of claim 7 wherein said means for controlling said variable inductance comprises means for passing a direct current through said control winding means, and further including voltage regulation means comprising means for sensing said DC output voltage, means for generating a reference voltage, means for comparing said sensed DC output voltage and said reference voltage and in response generating an error current, and means for controlling said variable inductance in accordance with said error current.

14. The self-oscillating power converter of claim 9, 10, 12 or 13, wherein said means for controlling said magnetizing inductance further comprises a zener diode characterized by a predetermined zener diode voltage, said zener diode being connected between said output and said first pair of windings for detecting deviation in said DC output voltage from said zener diode voltage, said deviation being translated to a proportional DC control current, and applying said DC control current to said first pair of windings thereby changing said variable inductance which in turn changes said frequency of said oscillations and consequently varies said impedance of said reactive network means which, in conjunction with said rectification means, reduces said deviation.

* * * * *

UNITED STATES PATENT AND TRADEMARK OFFICE
CERTIFICATE OF CORRECTION

PATENT NO. : 5,430,632
DATED : July 4, 1995
INVENTOR(S) : Meszlenyi

It is certified that error appears in the above-indentified patent and that said Letters Patent is hereby corrected as shown below:

On the title page, Item [73] :

Assignee is identified as " Powerpaq Industries Inc."
should read --Powerpaq Technologies Inc.--"

Signed and Sealed this

Twenty-seventh Day of May, 1997

Attest:

BRUCE LEHMAN

*Attesting Officer*  *Commissioner of Patents and Trademarks*